US008230024B2

(12) United States Patent
Ramanathan et al.

(10) Patent No.: US 8,230,024 B2
(45) Date of Patent: Jul. 24, 2012

(54) DELEGATING INSTANT MESSAGING SESSIONS

(75) Inventors: Rajesh Ramanathan, Redmond, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 11/770,000

(22) Filed: Jun. 28, 2007

(65) Prior Publication Data

US 2009/0006548 A1    Jan. 1, 2009

(51) Int. Cl.
*G06F 15/16*    (2006.01)
(52) U.S. Cl. ....................................................... 709/206
(58) Field of Classification Search .................. 709/204, 709/206
See application file for complete search history.

(56) References Cited

U.S. PATENT DOCUMENTS

| | | | |
|---|---|---|---|
| 5,283,856 A | 2/1994 | Gross et al. | |
| 6,292,840 B1 | 9/2001 | Blomfield-Brown et al. | |
| 6,360,272 B1 | 3/2002 | Lincke et al. | |
| 6,445,697 B1 | 9/2002 | Fenton | |
| 6,556,587 B1 | 4/2003 | Svanbro et al. | |
| 6,603,774 B1 | 8/2003 | Knappe et al. | |
| 6,621,893 B2 | 9/2003 | Elzur | |
| 6,633,582 B1 | 10/2003 | Panburana et al. | |
| 6,691,151 B1 | 2/2004 | Cheyer et al. | |
| 6,856,612 B1 | 2/2005 | Bjelland et al. | |
| 6,868,143 B1 | 3/2005 | Menon et al. | |
| 6,944,272 B1 | 9/2005 | Thomas | |
| 7,003,525 B1 * | 2/2006 | Horvitz et al. | 707/101 |
| 7,023,839 B1 | 4/2006 | Shaffer et al. | |
| 7,027,463 B2 | 4/2006 | Mathew et al. | |
| 7,039,043 B2 | 5/2006 | Sugihashi et al. | |
| 7,039,059 B2 | 5/2006 | Mizusawa et al. | |
| 7,257,203 B2 | 8/2007 | Quinton | |
| 7,286,650 B2 | 10/2007 | Pantana et al. | |
| 7,307,980 B1 | 12/2007 | Shah | |
| 7,486,667 B2 | 2/2009 | Feuer | |
| 2002/0087648 A1 | 7/2002 | Petrovykh | |
| 2002/0188777 A1 * | 12/2002 | Kraft et al. | 710/100 |
| 2003/0065724 A1 | 4/2003 | Clark | |
| 2003/0123622 A1 | 7/2003 | Gifford et al. | |
| 2003/0229722 A1 * | 12/2003 | Beyda | 709/310 |
| 2004/0073801 A1 | 4/2004 | Kalogridis et al. | |
| 2004/0161090 A1 | 8/2004 | Digate et al. | |
| 2004/0240636 A1 | 12/2004 | Quinton | |
| 2004/0260762 A1 | 12/2004 | Fish et al. | |
| 2005/0188030 A1 | 8/2005 | Hudecek | |
| 2006/0025164 A1 | 2/2006 | Wang et al. | |

(Continued)

FOREIGN PATENT DOCUMENTS

CN    1606327    4/2005

(Continued)

OTHER PUBLICATIONS

Bhide, et al. "Identity Delegation in Policy Based Systems" IEEE Conference on Automatic Computing. (2006) 2 pages.

(Continued)

*Primary Examiner* — Jason Recek

(57) ABSTRACT

The claimed subject matter provides a system and/or a method that facilitates redirecting an instant messaging session or an instant messaging communication. An interface component can receive a portion of data related to an instant messaging session, wherein the portion of data is associated with an instant messaging communication. A delegation component can automatically route the instant messaging session to a delegate for receipt of the instant messaging communication based upon a rule.

18 Claims, 10 Drawing Sheets

U.S. PATENT DOCUMENTS

| | | | |
|---|---|---|---|
| 2006/0031331 A1* | 2/2006 | LoBuono et al. | 709/206 |
| 2006/0031340 A1 | 2/2006 | Mathew et al. | |
| 2006/0062356 A1 | 3/2006 | Vendrow et al. | |
| 2006/0062370 A1 | 3/2006 | Agapi et al. | |
| 2006/0083358 A1 | 4/2006 | Fong et al. | |
| 2006/0168049 A1 | 7/2006 | Orozeo et al. | |
| 2006/0251056 A1 | 11/2006 | Feuer | |
| 2007/0033249 A1 | 2/2007 | Samdadiya et al. | |
| 2007/0081642 A1 | 4/2007 | Owens et al. | |
| 2007/0177717 A1 | 8/2007 | Owens et al. | |
| 2007/0239830 A1* | 10/2007 | Barnes et al. | 709/206 |
| 2008/0005254 A1* | 1/2008 | Adolphs et al. | 709/207 |
| 2008/0075066 A1* | 3/2008 | Baker | 370/352 |
| 2008/0120421 A1 | 5/2008 | Gupta et al. | |
| 2008/0120692 A1 | 5/2008 | Gupta et al. | |
| 2008/0147803 A1* | 6/2008 | Krzyzanowski et al. | 709/206 |
| 2008/0162642 A1* | 7/2008 | Bachiri et al. | 709/206 |
| 2008/0189374 A1* | 8/2008 | Odell et al. | 709/206 |
| 2008/0222717 A1* | 9/2008 | Rothstein et al. | 726/14 |
| 2008/0313257 A1* | 12/2008 | Allen et al. | 709/201 |
| 2009/0003542 A1 | 1/2009 | Ramanathan et al. | |
| 2009/0006632 A1 | 1/2009 | Ramanathan et al. | |
| 2009/0016499 A1* | 1/2009 | Hullfish et al. | 379/93.01 |
| 2009/0129566 A1 | 5/2009 | Feuer | |
| 2010/0185584 A1 | 7/2010 | Vendrow et al. | |
| 2010/0185960 A1* | 7/2010 | Christie et al. | 715/758 |

FOREIGN PATENT DOCUMENTS

| | | |
|---|---|---|
| WO | 0007102 | 2/2000 |
| WO | 2005008432 A2 | 1/2005 |
| WO | 2006016885 A1 | 2/2006 |
| WO | WO2006/074040 A2 | 7/2006 |

OTHER PUBLICATIONS

International Search Report and Written Opinion for PCT Application No. PCT/US/2008/065452 dated and mailed Dec. 12, 2008, 11 pages.

Nishiysms, et al. "Proposal of Message Delegation Service for Its Network Using Agent Technique" http://scholar.google.com/scholar?hl=en&lr=&q=cache:-icurEdbzacJ:www,naser.ofogh.net/tara/trafic6/torino/PDF/3592.

pdf++rules+for+Voice+and+Message+delegation+ last viewed Mar. 23, 2007, 10 pages.

Nardi, et al. "Interaction and Outeraction: Instant Messaging in Action" (2000) ACM, 10 pages.

Li, et al. "Extending Instant Messaging to Provide Personal Communication" (2006) International Workshop on System Support for Future Mobile Computing Applications, 8 pages.

Harrison, "Smart Networks and Intelligent Agents" (1995) Presented at Mediacom'95, 5 pages.

International Search Report and Written Opinion for PCT Application No. PCT/US2008/065455 completed Jan. 14, 2009 mailed Jan. 15, 2009, 11 pages.

Chinese Office Action dated Feb. 23, 2011 for Chinese Patent Application No. 200880022312.5, 18 pages.

OA dated Mar. 22, 2011 for U.S. Appl. No. 11/768,439, 16 pages.

Notice of Allowance dated Jul. 25, 2011 for U.S. Appl. No. 11/768,439, 17 pages.

"European Search Report", Mailed Date: Apr. 29, 2011, Application No. PCT/US2010/, Filed Date: Apr. 28, 2011, pp. 9.

Chinese Office Action dated Feb. 21, 2012 for Chinese Patent Application No. 200880022313.X, 11 pages.

* cited by examiner

DELEGATING INSTANT MESSAGING SESSIONS

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

As computing and network technologies have evolved and have become more robust, secure and reliable, more consumers, wholesalers, retailers, entrepreneurs, educational institutions and the like are shifting paradigms and are employing the Internet to perform business, rather than employing traditional means. For example, today consumers can access their bank accounts on-line (e.g., via the Internet) and can perform an ever growing number of banking transactions such as balance inquiries, fund transfers, bill payments, and the like. In light of such technological advances and evolution, people in general tend to be more and more concerned about being connected and/or available for various communications such as cell phone calls, text messages, emails, instant messages, land line phone calls, voice mails, real-time communications, etc. With the rapid pace of today's society, being available and/or reachable on a constant basis is fitting for busy lifestyles be they personal or business.

In general, real-time communications can include communication applications that establish and manage connections or communication sessions between computing devices, users, machines, and the like. For instance, an instant messaging service can be utilized between two users on distinct machines, in order to communicate in real-time. Real-time communication services can utilize various mechanisms to establish a communication session such as, for instance, an application-level control protocol that computing devices can utilize to discover one another and manage communication sessions there between (e.g., establish, modify, terminate, etc.).

With the typical standard and desire of continuously being available and/or communicating in a time-efficient manner, instant messaging services have erupted onto the scene as a quick and efficient manner to communicate with one another. For instance, rather than walking over to a colleague's office or calling such colleague, an instant message can be sent which is quicker and less intrusive to the colleague. However, instant messaging proves effective only when the individual is physically present utilizing the instant messaging application. Following the above example, if the colleague is not in the office, the effectiveness of the instant messaging session is greatly reduced based on the lag and/or delay in waiting for a possible response. Moreover, status identifiers (e.g., away, do not disturb, out of office, etc.) only add to the ineffectiveness since the intended and/or possible instant messaging communication is abruptly halted.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate employing a delegation rule to forward and/or redirect an incoming instant messaging session. A delegation component can receive instant messaging data (e.g., instant messaging session data, instant messaging communication data, etc.) via an interface component, wherein the delegation component can automatically route, forward, and/or re-direct instant messaging sessions/communications to a delegate. Thus, the delegation component can employ a delegation rule (e.g., a rule) that can assign a delegate to handle and/or receive an instant message, an instant messaging session, and/or an instant messaging communication. For example, a delegation rule for an entity can delegate user A to receive incoming instant messages. Moreover, the delegation component can provide notification to a sender of an instant message in which such notification can allow the sender to continue with the delegated communication or terminate such communication.

In accordance with an aspect of the subject innovation, the delegation component can include a continuation component that enables a delegated instant messaging session or communication to be restarted, continued, revived, and/or interjected. For instance, an instant message session and/or communication that has been receiving during a delegation period (e.g., time in which a rule is employed) can include a corresponding history item. The continuation component can enable the seamless restart and/or continuation of the delegated instant messaging session and/or communication by utilizing the history item. In other aspects of the claimed subject matter, methods are provided that facilitate redirecting an incoming instant messaging session to a delegate.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
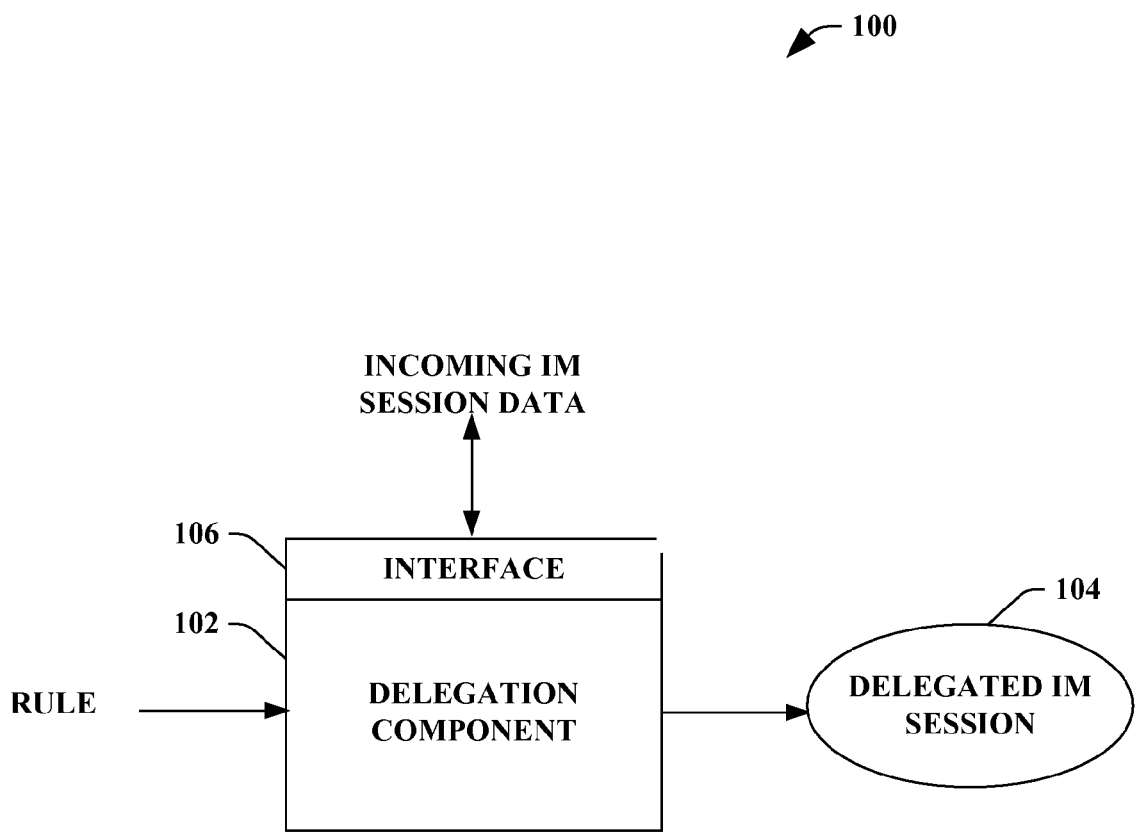
FIG. 1 illustrates a block diagram of an exemplary system that facilitates employing a delegation rule to forward and/or redirect an incoming instant messaging session.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "identifier," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates employing a delegation rule to forward and/or redirect an incoming instant messaging session. The system 100 can include a delegation component 102 that can implement a delegated instant messaging (IM) session 104 by redirecting and/or forwarding a portion of incoming IM session data based at least in part upon a rule (e.g., a delegation rule). The delegation component 102 can enhance an instant messaging session by providing delegation capabilities, wherein a created delegation rule can assign an entity (e.g., user, machine, company, administrator, enterprise, department, a website, a network, a server, a device, a client, etc.) to handle and/or receive at least one incoming instant message. Moreover, the delegation component 102 can provide adequate privacy techniques in which a sender and/or initiator of the instant messaging session can be informed and/or notified of the delegation scenario/situation. In general, the delegation component 102 can receive a portion of incoming IM session data via an interface component 106, wherein such incoming IM session data can be re-routed, re-directed, transferred, and/or forwarded to a delegate assigned and/or defined by a rule (e.g., a delegation rule) in order to employ the delegated IM session 104.

For instance, user A can create a delegation rule in which any incoming IM communications, requests/invites for IM session, etc. can be forwarded, re-routed, re-directed, and/or transferred to an assistant A. Thus, if user B sends an instant message to user A, user B can automatically receive an instant message informing that user A has delegated incoming IM sessions to assistant A. Based on such notification, the option can be provided in which user B chooses to initiate an IM session with the delegate (e.g., assistant A) or chooses to not partake in the delegated IM session. It is to be appreciated that the delegation rule can be selective to which incoming IM sessions and/or communication can be forwarded, redirected, delegated, etc. Thus, the delegation rule created by user A can define an incoming instant message from user B to be routed to assistant A, but an incoming instant message from user C can be routed to boss A.

It is to be appreciated that an instant messaging session can be any suitable data communication utilizing an instant messaging service and/or service provider, wherein such data communication can include audio, video, text, numeric, graphic, and the like. Moreover, the instant messaging session can include a sender (e.g., an entity that transmits a data communication via instant messaging) and a target (e.g., an entity that is intended for receipt of such data communication via instant messaging). The instant messaging session can include various portions of data that can be communicated between the sender and the target (e.g., and vice versa) utilizing the instant messaging service and/or service provider. For instance, a sender can initiate an instant message session with a target, wherein the instant message session can enable instant message communication there between.

In addition, the system 100 can include any suitable and/or necessary interface component 106 (herein referred to as "interface 106"), which provides various adapters, connectors, channels, communication paths, etc. to integrate the delegation component 102 into virtually any operating and/or database system(s) and/or with one another. In addition, the interface component 106 can provide various adapters, connectors, channels, communication paths, etc., that provide for interaction with the delegation component 102, the delegated IM session 104, a rule, an instant messaging session, a portion of data communicated within the instant messaging session, and any other device and/or component associated with the system 100.

Figure 2:
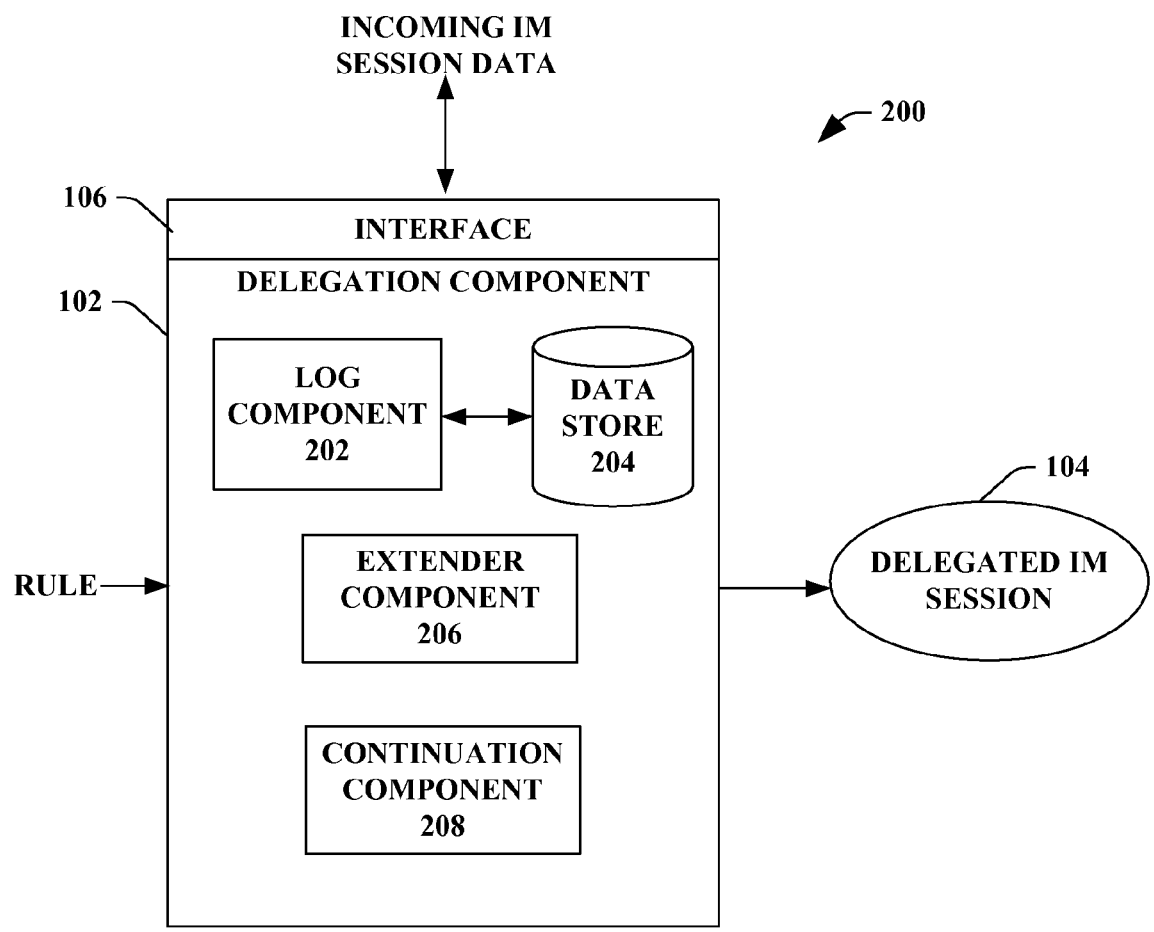
FIG. 2 illustrates a block diagram of an exemplary system that facilitates redirecting an incoming instant messaging session to a delegate.

FIG. 2 illustrates a system 200 that facilitates redirecting an incoming instant messaging session to a delegate. The system 200 can include the delegation component 102 that can route an incoming instant message and/or a portion of an instant messaging session to an entity (e.g., user, machine, company, administrator, enterprise, department, a website, a network, a server, a device, a client, etc.). In particular, a rule can be created which assigns a delegate to handle and/or receive data communications associated with instant messaging, an instant messaging session, instant messaging communications, an instant messaging service, and/or an instant messaging service provider. Thus, any instant messaging communications and/or instant messaging sessions can be re-routed to the delegate utilizing a rule (e.g., a delegation rule) rather than having such instant messages, communications, or sessions being unresponsive.

It is to be appreciated that the delegation rule can include data such as, but not limited to, length and/or duration of enforcement, assigned delegate, notification settings, particular delegates for specific incoming instant messages, historic data accessibility (e.g., users who are allowed to view, edit, etc.), continuation of instant messaging session options (e.g., time allotted to allow a communication to be continued, etc.), data communication extension settings (e.g., extension to particular data communication modes, devices, techniques, etc.), password/security settings, logging options (e.g., duration of records, which communications to log, etc.), monitoring/tracking details (e.g., delegates to monitor, amount of communication to monitor/record, etc.), routing options (e.g., delegate incoming instant message, forward incoming instant message, provide copies of incoming instant message, etc.), etc. In one example, the delegation rule can include a plurality of delegates for the instant messaging session and/or instant messaging communication. In such example, a sender can select a particular delegate to handle and/or receive the instant message on behalf of the target.

The system 200 can include a data store 202 that can include any suitable data related to the delegation component 102, the delegated IM session 104, an incoming IM session, a rule, an instant message, an instant messaging communication, an instant messaging service, etc. For example, the data store 202 can include, but not limited to including, delegation rules, delegation assignment, instant messaging service data (e.g., login, user name, screen name, alias, etc.), passwords, user preferences, historic data access preferences, historic data related to instant messaging sessions, trusted/authenticated delegate listings, and/or any other data related to the system 200.

It is to be appreciated that the data store 202 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 202 of the subject systems and methods is intended to comprise, without being limited to, these and any other suitable types of memory. In addition, it is to be appreciated that the data store 202 can be a server, a database, a hard drive, a pen drive, an external hard drive, a portable hard drive, and the like.

The system 200 can utilize a log component 204 that tracks data in accordance with the claimed subject matter. In particular, the log component 204 can track and/or monitor data related to delegation component 102, rules, instant messages, instant messaging sessions, instant messaging communications, delegated IM sessions 104, rule settings/details (discussed in detail below), and/or most any suitable data related to the system 200. For example, the log component 204 can track instances in which an instant messaging session or communication is delegated in order to provide an accurate history of incoming and delegated/redirected data communications. In another example, the log component 204 can monitor at least one of an approval or a disapproval of employing the delegated IM session 104. By tracking at least one of an approval or disapproval, the delegation rule can be manipulated according to each sender's preference (e.g., no delegation, delegation to user A and not user C, etc.). Moreover, the log component 204 can store the logged entries in a data store 202.

It is to be appreciated that the log component 202 can further provide summarizations and/or descriptive data related to the delegated IM session 104. The log component 202 can track instant messaging communications within an instant message session, wherein topics of conversation, names, places, context, key words, etc. can be identified for tracking and/or monitoring. With the log component 204 monitoring conversation context and/or topics, detailed summaries can be provided to enable efficient review of a delegated IM session 104. For instance, a delegated IM session can include communications involved with a new hire in the accounting department, in which such data (e.g., new hire, accounting, etc.) can be tracked, logged, and/or monitored to provide summarization for an entity creating the delegation rule.

The system 200 can further utilize an extender component 206 that can employ a delegation rule across a plurality of data communication modes (e.g., email, voice, audio, video, voicemail, etc.). In particular, the delegation rule can be employed to an instant messaging communication or service, wherein such rule can be extended to an additional data communication mode to enable any incoming data communication to be delegated based upon the delegation rule. It is to be appreciated and understood a rule associated with redirecting, forwarding, re-routing, etc. can be utilized by the delegation component 102 for instant messaging regardless of data communication mode association. In other words, an email forwarding rule can be translated and/or converted by the extender component 206 to be utilized in accordance with the delegation component 102. For example, the delegation for instant messaging communications can be set from an email client when other delegates for email and/or calendaring are being configured and/or set up. For example, when a user is configuring delegates for an email application and/or a calendar application, such delegates can be set up and/or carried over for instant messaging communications.

For instance, the delegation rule can be created, generated, edited by any suitable entity that can utilize instant messaging services. In one particular example, the delegation rule (e.g., the rule) can be automatically created by the extender component 206 based on evaluating disparate data communication modes and identifying delegation/forwarding rules associated therewith, wherein such delegation/forwarding rules can be emulating to be utilized with instant messaging communications and/or sessions.

A continuation component 208 can be utilized by the delegation component 102 within the system 100. The continuation component 208 enables a delegated IM session 104 to be continued and/or re-initiated. The continuation component 208 can enable an instant messaging session to be restarted, continued, interrupted, interjected (e.g., during the communication between the delegate and the sender), and/or revived by an entity, wherein the entity can be the target of such instant messaging communication. For instance, conversation history within an instant messaging session can be tracked when a delegate has handled and/or received an IM session and/or communication. A user can optionally receive the instant messaging communications with the delegate and choose to reply to the conversation utilizing the continuation component 208. It is to be appreciated that from the sender's perspective, this can appear to be a continued conversation and/or instant messaging session in the same window but just with a different individual (e.g., not the delegate but the intended target). Thus, data communications associated with the instant messaging session can be included within the continued conversation so as the history of the conversation can be referenced.

In one example, a user A can delegate user B to receive incoming instant message communications. User C can initiate an IM session with user A and accept the delegated IM session with user B, wherein such technique enables an instant message sender to become aware of the delegation scenario and/or situation. User B and user C can communicate with instant messages about, for instance, the various car dealers in a surrounding location. User A can identify this delegated conversation and opt to continue it with user C, wherein the continued conversation can include previous communications (e.g., conversation about the car dealers in the surrounding location) between user C and user B (e.g. the delegate).

In another example, delegation can be provided for offline scenarios. For instance, when a manager and a delegate are offline with pending instant messaging communications for the manager, the system 200 can provide options and/or settings for delivery. If the manager and delegate are offline, the messages can be delivered dependent upon the manager's preference of who comes online first. Moreover, if the manager is offline and the delegate is online, the messages can be transmitted to the delegate first. In another example, if the delegate is offline and the manager is online, the manager can receive notification of the incoming messages that will be delivered to the delegate. In still another example, when the delegate is offline, the system 200 can route the instant messaging communications to the manager directly rather than delegating these to the delegate (e.g., dynamically change delegation).

Moreover, the system 200 can notify the sender in various manners. An option can be provided that the sender is notified and asked for their approval prior to sending the instant messaging communication to the delegate. For instance, the intermediate server can intercept the instant messaging communication and send the approval notice to the sender and then the sender can click this for approval. In another example, the sender can have an option to specify a "do not delegate" on the front end of the instant messaging communication. Thus, the system 200 can allow a "do not delegate" option in which the instant messaging communication invitation can carry appropriate headers to notify the delegating server as not to send the instant messaging communication to the delegate. In such an example, the instant messaging communication will fail if the receiver has specific that an instant messaging communication should be sent to the delegate with the appropriate error message/notification.

Figure 3:
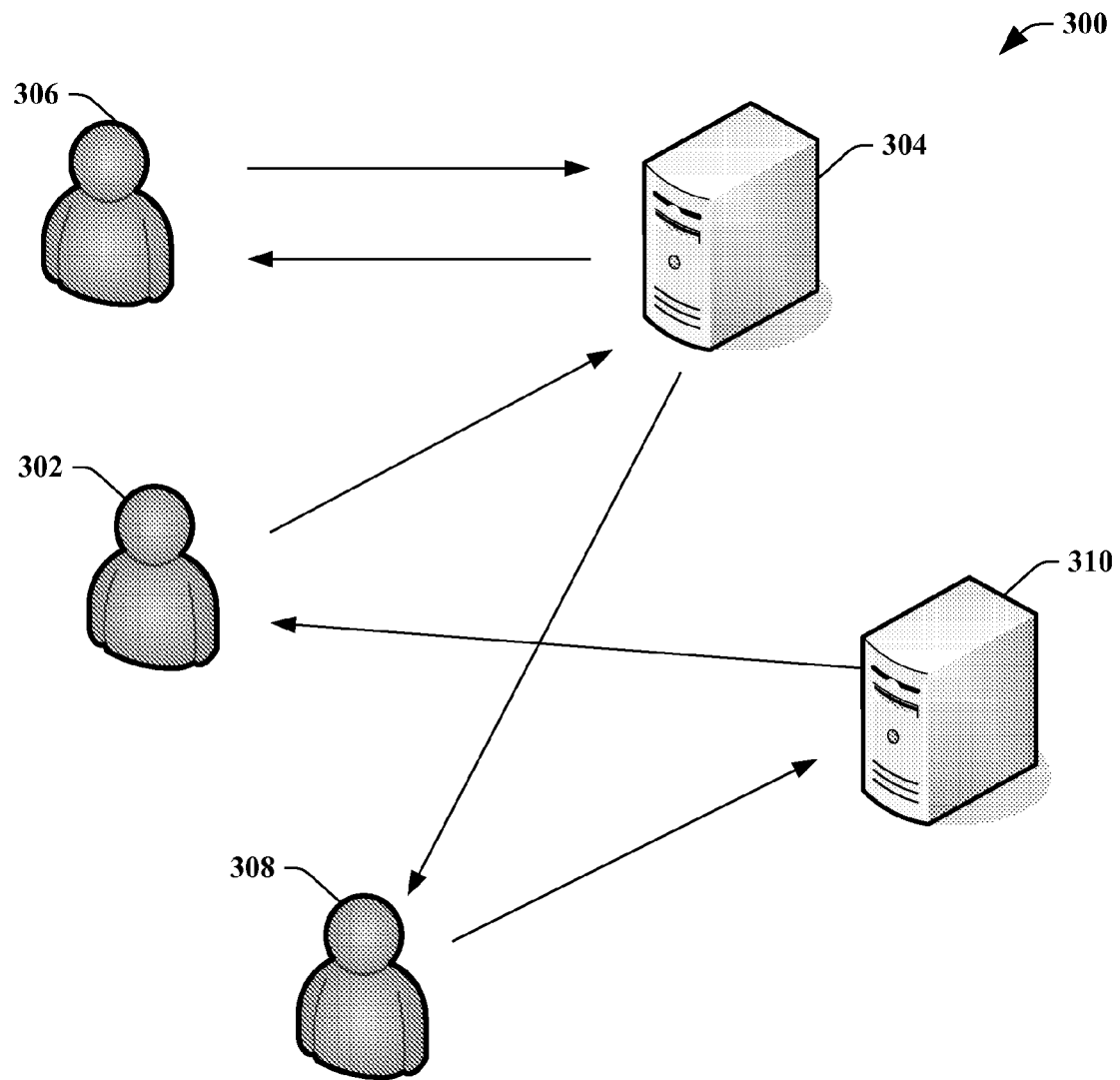
FIG. 3 illustrates a block diagram of an exemplary system that facilitates employing a delegation rule utilized within instant messaging sessions.

FIG. 3 illustrates a system 300 that facilitates employing a delegation rule utilized within instant messaging sessions. The system 300 can include a client 302 that can create at least one delegation rule associated with redirecting, re-routing, forwarding, and/or delegation instant messaging communications and/or sessions. The client 302 can publish the rule to a server 304, wherein the server 304 can maintain the rule for routing instant messages (e.g., substantially similar to a rule for voice delegations). A sender 306 can originate and/or initiate at least one of an instant message, an instant messaging communication, an instant messaging session, etc. with the client 302. The server 304 can redirect the instant message and/or a disparate instant messaging back to the sender 306 in order to notify such sender 306 that the client 302 has delegated instant messaging communications. For instance, the server 304 can display a warning and allow the sender 306 to follow an invitation to an instant messaging session and/or communication with an admin 308 (e.g., the admin can be the delegate assigned by the created delegation rule and can be any suitable entity that can receive and/or handle instant messaging communications). The sender 306 can accept and/or agree to initiate an instant messaging session with the admin 308 instead and allow the invitation to be sent. After the admin 308 and the sender 306 communicate via instant messaging, a history item can be stored in a shared location (e.g., email folder, voicemail folder, audio file, voicemail file, email file, etc.) on a server 310. The client 302 can view such conversation (e.g., the history item) from the shared location and continue this conversation with the sender 306.

The system 300 can allow the delegation of instant messages from an application along with voice from a client such as an integrated enterprise communication client which enables real-time communications utilizing unified communications and corresponding data communication modes (e.g., instant messaging, voice over Internet protocol (VoIP) communication, video conferencing, audio, voice, desktop sharing, application/software sharing, etc.). The system 300 can further allow forwarding rules to be set on a server so that an instant message invitation can be forwarded and/or delegated in a substantially similar manner as a voice call. In another example, an instant message routed to a delegate can be redirected to the sender with an audio visual feedback in which the sender can choose to proceed with a conversation with the delegate.

Furthermore, the subject innovation can provide multimodal conversations during instant messaging delegation. For instance, if an instant message is delegated, a voice call added to the instant messaging session can be delegated as well. The claimed subject matter, in addition, can store conversation history for a delegated instant messaging conversation and that the conversation can be recorded that the instant message was accepted "on behalf" of the targeted entity (e.g., the entity created and employing the delegation rule, the client 302, etc.). The delegate can further restart the instant messaging session and/or communication from the history item (e.g., the conversation history) and can identify such situation as "incoming instant message on behalf of" the targeted entity (e.g., the entity created and employing the delegation rule, client 302, etc.). Moreover, the client 302 can optionally access the history of the instant messaging conversation with the delegate and/or admin 308. In another example, the client 302 can respond directly referring to the same conversation, wherein the sender 306 can get a continued conversation with the client 302 about the same conversation.

Figure 4:
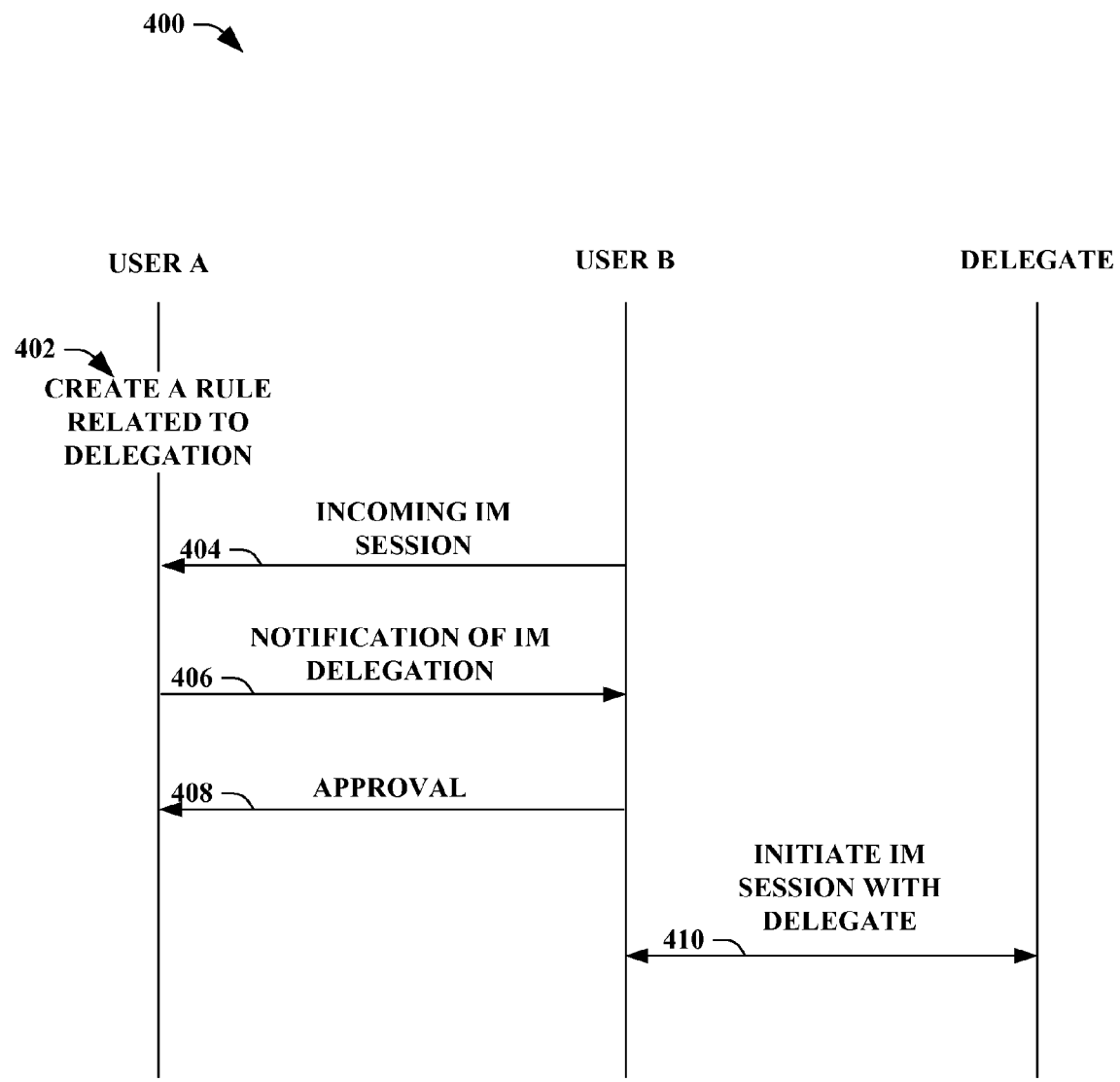
FIG. 4 illustrates a block diagram of an exemplary timing diagram that facilitates initiating a delegated instant messaging session utilizing a privacy notification technique.

FIG. 4 illustrates a timing diagram 400 that facilitates initiating a delegated instant messaging session utilizing a privacy notification technique. It is to be appreciated that the timing diagram 400 is just one illustration in accordance with the subject innovation and is not to be limiting on the claimed subject matter. The timing diagram 400 can include a user A, a user B, and a delegate, wherein the user A, the user B, and/or the delegate can be any suitable entity that can employ an instant messaging session and/or instant messaging communication.

At reference numeral 402, user A can create a delegation rule (e.g., a rule) related to delegation of any instant messaging session and/or any instant messaging communication. For example, the delegation rule can assign an entity (e.g., the delegate) to receive and/or handle incoming instant messages. Once the rule is created and employed, an incoming instant message session can be initiated and/or originated by user B targeted to user A at reference numeral 404. It is to be further appreciated that the incoming instant messaging session can include any suitable instant messaging communication (e.g., text, audio, voice, graphic, video, etc.). At reference numeral 406, an automatic notification can be communicated to user B, wherein such notification can notify user B of the delegation scenario and/or situation (e.g., entity named as delegate, time of assigned delegation, duration of delegation, etc.). At reference numeral 408, user B can communicate approval and/or acceptance of the delegation. At reference numeral 410, an instant messaging session can be initiated with the delegate on behalf of user A based upon the delegation rule.

Figure 5:
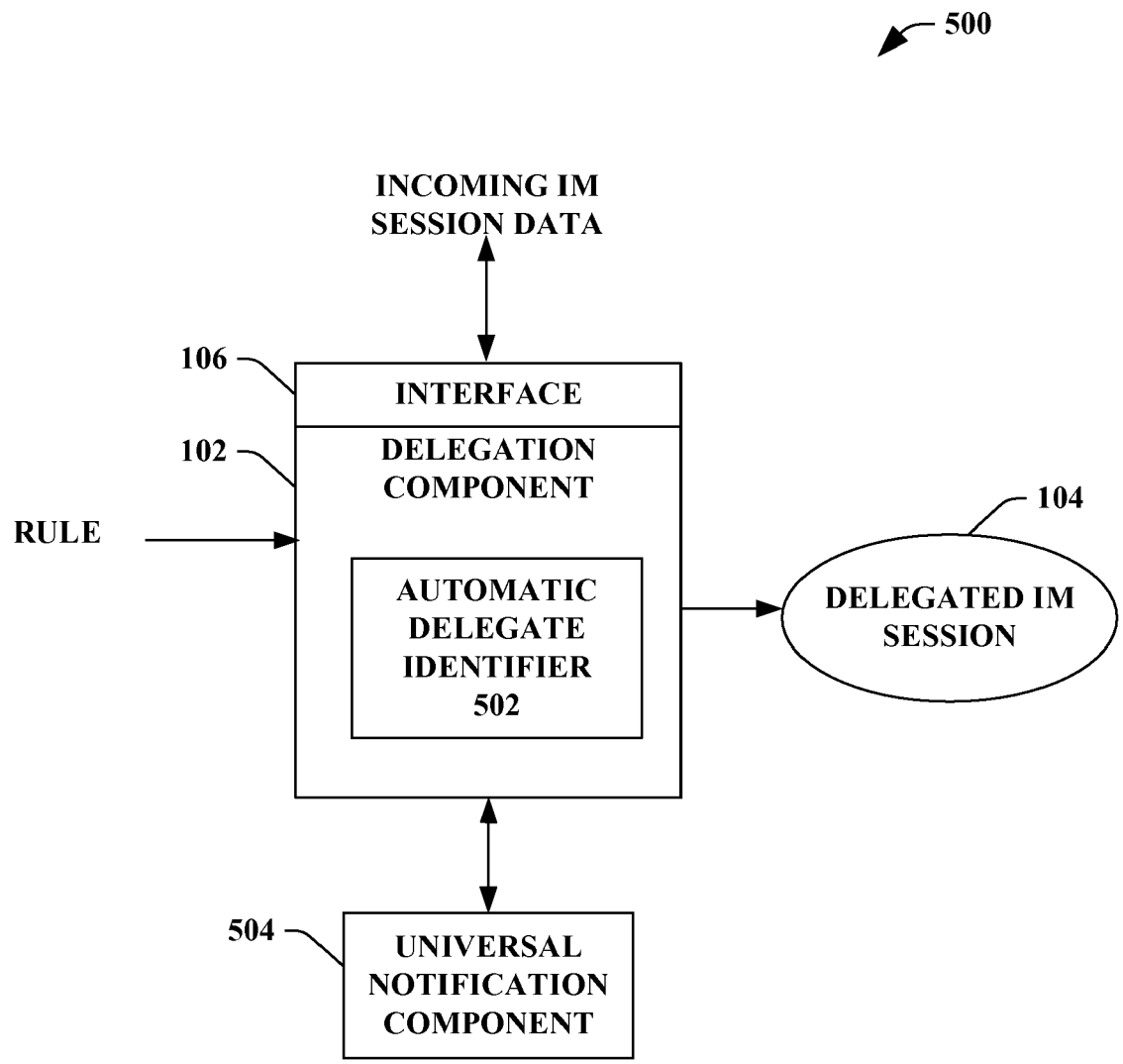
FIG. 5 illustrates a block diagram of exemplary system that facilitates automatically redirecting an instant messaging session to a delegate for enhanced data communications.

FIG. 5 illustrates a system 500 that facilities automatically redirecting an instant messaging session to a delegate for enhanced data communications. The system 500 can include the delegation component 102 that can redirect an instant message session and/or an instant message communication in order to provide the delegated instant message session 104. As previously discussed, the delegation component 102 can enable a rule to assign an entity to receive any instant messaging sessions and/or instant messaging communications on behalf of a particular entity. As an example, a particular user can create a delegation rule for instant messaging sessions to be forwarded and/or directed to an assistant, wherein an incoming instant message can be handled and/or received by such assistant. Moreover, the particular user can access a historic log of such delegated communications in which to view, track, and/or continue/restart.

The system 500 can utilize an automatic delegate identifier 502 that can automatically identify an appropriate and/or qualified delegate to redirect and/or re-route an instant message, an instant message session, and/or an instant message communication. For example, the automatic delegate identifier 502 can automatically identify a delegate to handle and/or receive an instant message based at least in part upon evaluating a portion of data related to current, previous, and/or inferred instant messages. The automatic delegate identifier 502 can evaluate at least one of an incoming instant message, an instant message communication, an instant message session, a portion of historic data related to an instant message communication related to a sender (e.g., previous conversations between sender and target, etc.), a portion of data related to a sender (e.g., profile data, demographic data, business information, status within a company, department affiliation, etc.), previous delegation assignments, historic data related to delegation rules, incoming instant message topic/context, and/or any other suitable data related to identifying a delegate with pre-existing knowledge of an incoming instant message topic/context.

The delegation component 102 can further utilize a universal notification component 504 that can provide notification of the delegated instant message session 104 across a plurality of data communication modes (e.g., email, voice, audio, voicemail, video, text message, VoIP communication, short message service (SMS), etc.) for a variety of devices/components (e.g., laptop, desktop, smartphone, hand-held, pager, media device, gaming device, portable digital assistant, microcomputer, mobile communication device, cellular device, telephone, VoIP device, etc.). In particular, the notification can relate to the acceptance of the delegation for an instant messaging communication and/or session. Thus, if a user delegates user B as a delegate to receive and/or handle incoming instant messages, the universal notification component 504 can provide notification to the user upon acceptance or approval of the instant message session being delegated to user B. Such notification can be across any suitable data communication mode available for the user, such as, but not limited to, unified communications (e.g., voice, audio, voicemail, email, video, etc.).

Figure 6:
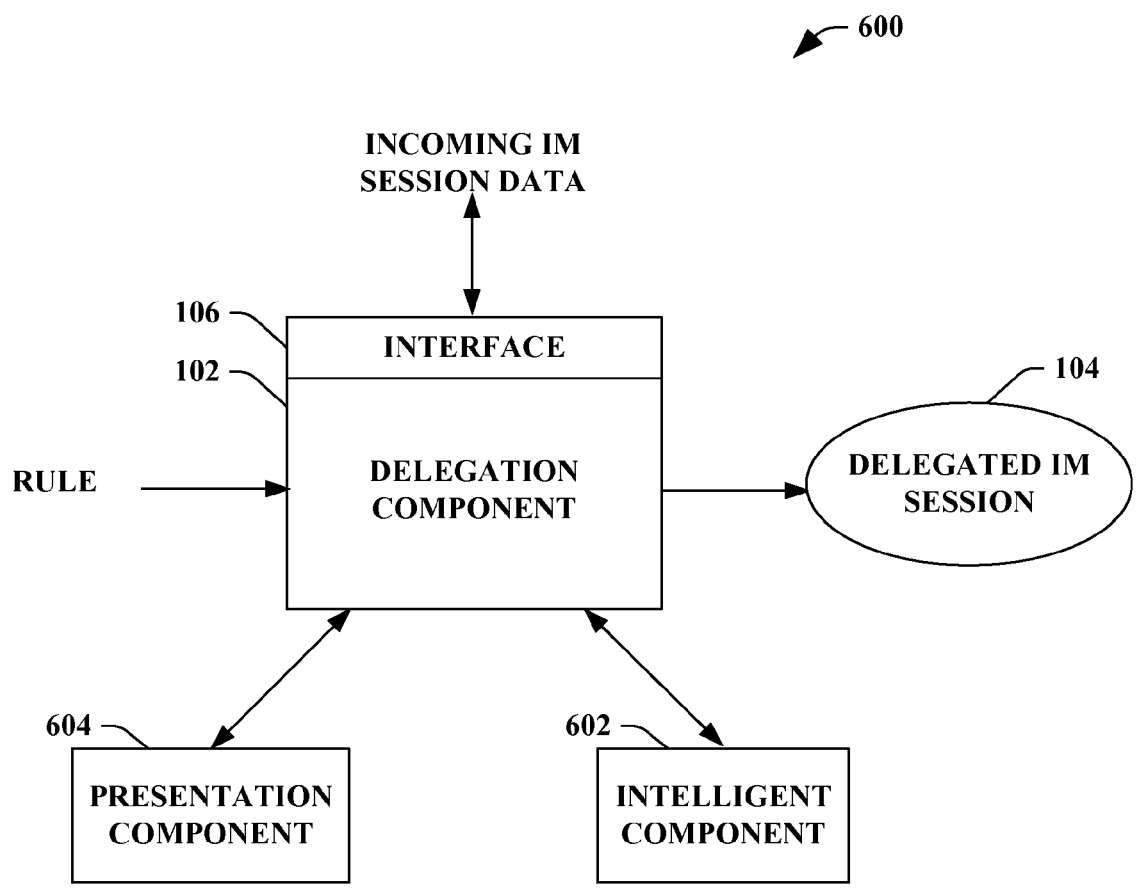
FIG. 6 illustrates a block diagram of an exemplary system that facilitates transferring an instant messaging session upon notification and approval of such transfer.

FIG. 6 illustrates a system 600 that employs intelligence to facilitate transferring an instant messaging session upon notification and approval of such transfer. The system 600 can include the delegation component 102, the delegated IM session 104, and/or the interface 106. It is to be appreciated that the delegation component 102, the delegated IM session 104, and the interface 106 can be substantially similar to respective components, sessions, and interfaces described in previous figures. The system 600 further includes an intelligent component 602. The intelligent component 602 can be utilized by the delegation component 102 to facilitate automatically routing and/or re-directing an instant message communication and/or instant message session to an assigned delegate based upon a rule (e.g., a delegation rule). For example, the intelligent component 602 can infer delegation assignment, duration of delegation, delegation rules, acceptance of initiating a delegated instant message session, denial of initiating a delegated instant message session, rule settings/options, historic item configuration, instant message session continuation preferences, context/topic of instant message, identification of delegate with pre-existing knowledge of a topic/context for efficient delegation, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The delegation component 102 can further utilize a presentation component 604 that provides various types of user interfaces to facilitate interaction between a user and any component coupled to the delegation component 102. As depicted, the presentation component 604 is a separate entity that can be utilized with the delegation component 102. However, it is to be appreciated that the presentation component 604 and/or similar view components can be incorporated into the delegation component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the delegation component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
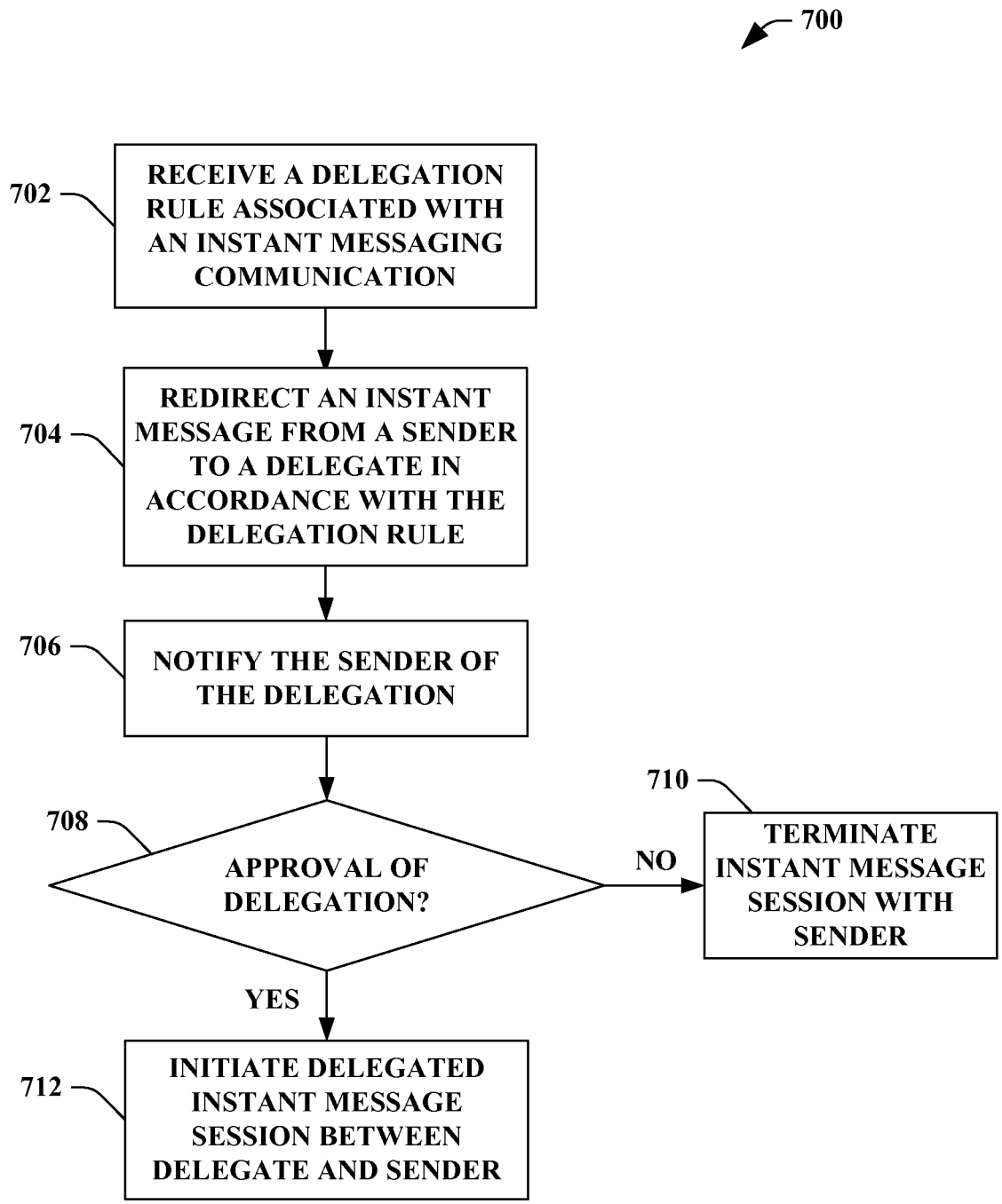
FIG. 7 illustrates an exemplary methodology for employing a delegation rule to forward and/or redirect an incoming instant messaging session.
Figure 8:
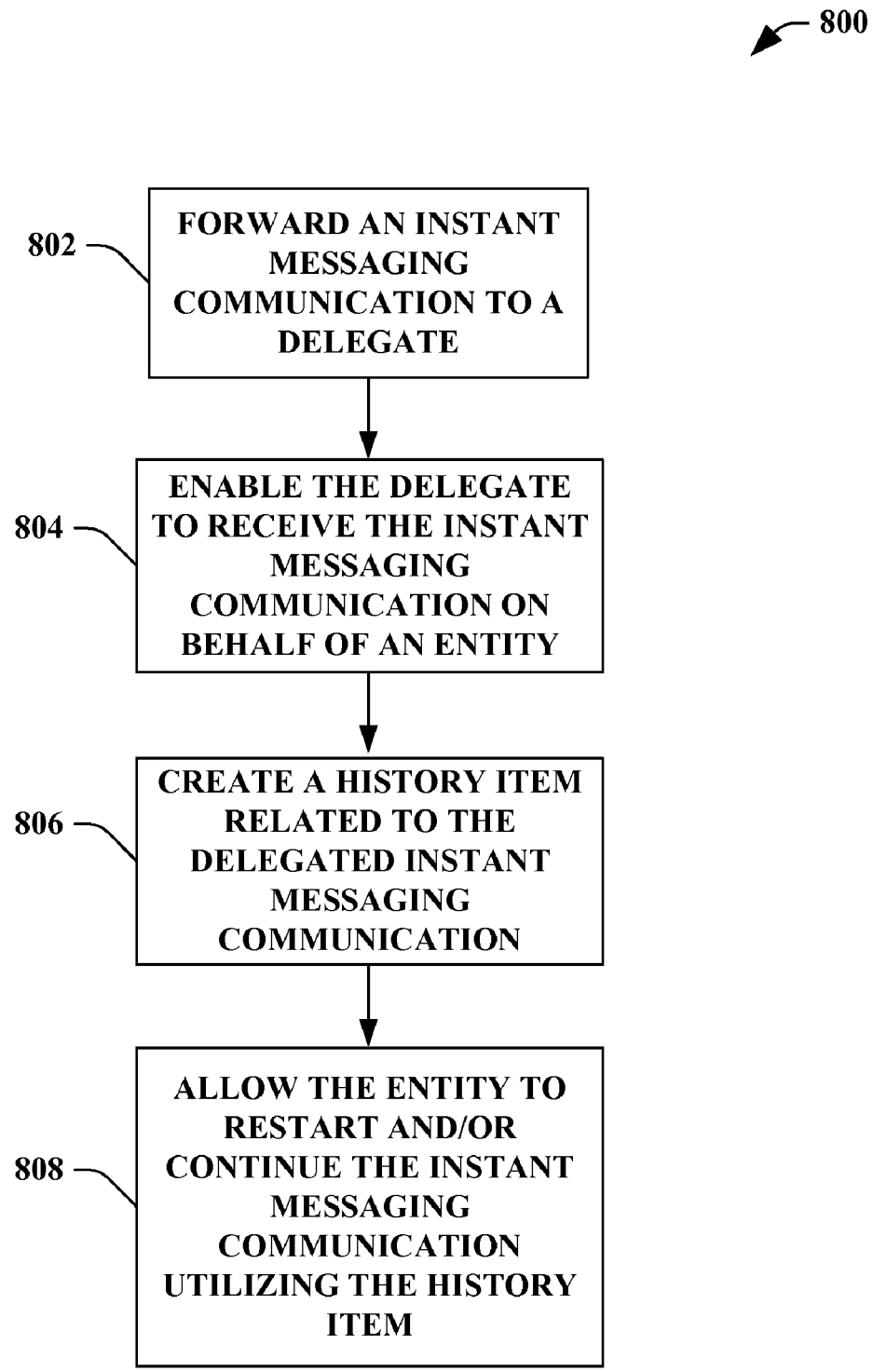
FIG. 8 illustrates an exemplary methodology that facilitates redirecting an incoming instant messaging session to a delegate.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates employing a delegation rule to forward and/or redirect an incoming instant messaging session. At reference numeral 702, a delegation rule associated with an instant messaging communication can be received. It is to be appreciated that the delegation rule can be created, generated, and/or provided as a default setting. For instance, an entity can create a delegation rule that can identify a delegate (e.g., an entity that can handle and/or receive an instant message communication on behalf of someone) and/or time duration for delegation. At reference numeral 704, an instant message from a sender can be redirected to a delegate in accordance with the delegation rule. For example, a sender can initiate an instant message to a target, wherein the target has employed a delegation rule designating a delegate to handle and/or receive any instant message communications. Thus, the sender's initiated instant message to the target can be redirected to the delegate.

At reference numeral 706, the sender can be notified of the delegation. In particular, the sender can receive an instant message informing of the delegation scenario and/or situation with details associated therewith. For instance, the notification can indicate the sender of the delegate handling and/or receiving instant message communications, the duration of the delegation, and/or a reason/circumstance for the delegation (e.g., out of town, in a meeting, vacation, etc.). Moreover, the notification can be any suitable data communication (e.g., email, text, instant message, voice, audio, video, VoIP communication, etc.) in any data communication mode.

At reference numeral 708, a determination is made whether approval of the delegation is received from the sender. If there sender does not provide approval of the delegation, the methodology 700 can continue to reference numeral 710. At reference numeral 710, the instant message session (e.g., including the instant message communication) with the sender can be terminated and/or ended. For instance, the instant message communication can be stored for later access (e.g., similar to a voicemail, or an instant message answering machine/device). If the sender does provide approval for the delegation, the methodology 700 can continue to reference numeral 712. At reference numeral 712, a delegated instant message session can be initiated between the delegate and the sender. Thus, the instant message communication within the instant message session can be handled and/or received by the delegate on an entity's behalf based at least in part upon the delegation rule.

FIG. 8 illustrates a method 800 for redirecting an incoming instant messaging session to a delegate. At reference numeral 802, an instant messaging communication from a sender can be forwarded to a delegate. For instance, a rule and/or a delegation rule can be created by an entity which assigns a disparate entity as a delegate. In another example, a default delegate can be utilized with instant messaging communications. At reference numeral 804, the delegate can be enabled to receive the instant messaging communication on behalf of the entity (e.g., the entity that creates and/or employs the delegation rule). Thus, an instant messaging communication can be handled and/or received by the delegate, wherein such instant messaging communication from the sender was intended for the entity which created and/or employed the rule.

At reference numeral 806, a history item related to the delegated instant messaging communication can be created. For example, historic items related to delegated instant messaging communications can be stored in order to allow the entity to view delegated communication sessions. For instance, an entity can view a portion of delegated instant messaging communication sessions in order to monitor such interactions between various senders and corresponding delegates. At reference numeral 808, the entity can be allowed to restart and/or continue the instant messaging communication utilizing the history item. Thus, a delegated instant messaging communication can be restarted, continued, and/or re-initiated with the history item(s). Such continuation can allow seamless transition for instant messaging sessions between a sender and a delegate to the sender and the entity who assigned the delegate.

Figure 9:
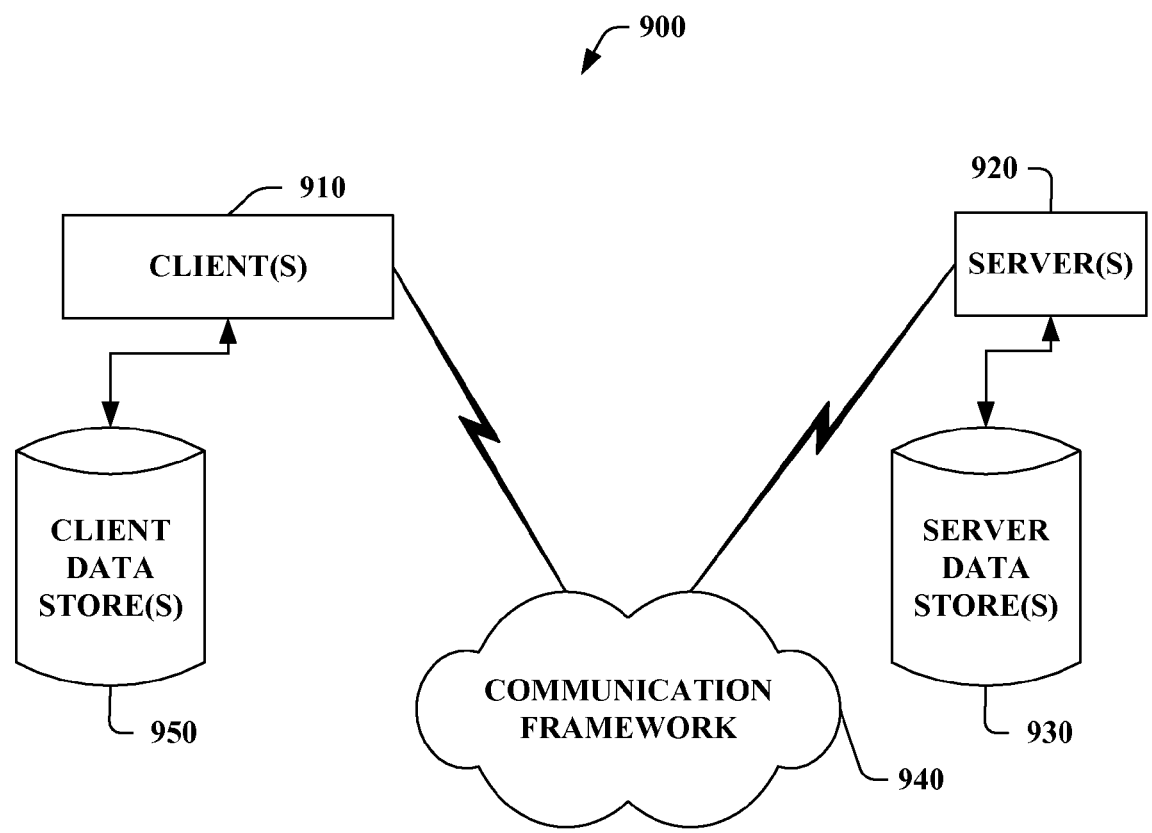
FIG. 9 illustrates an exemplary networking environment, wherein the novel aspects of the claimed subject matter can be employed.
Figure 10:
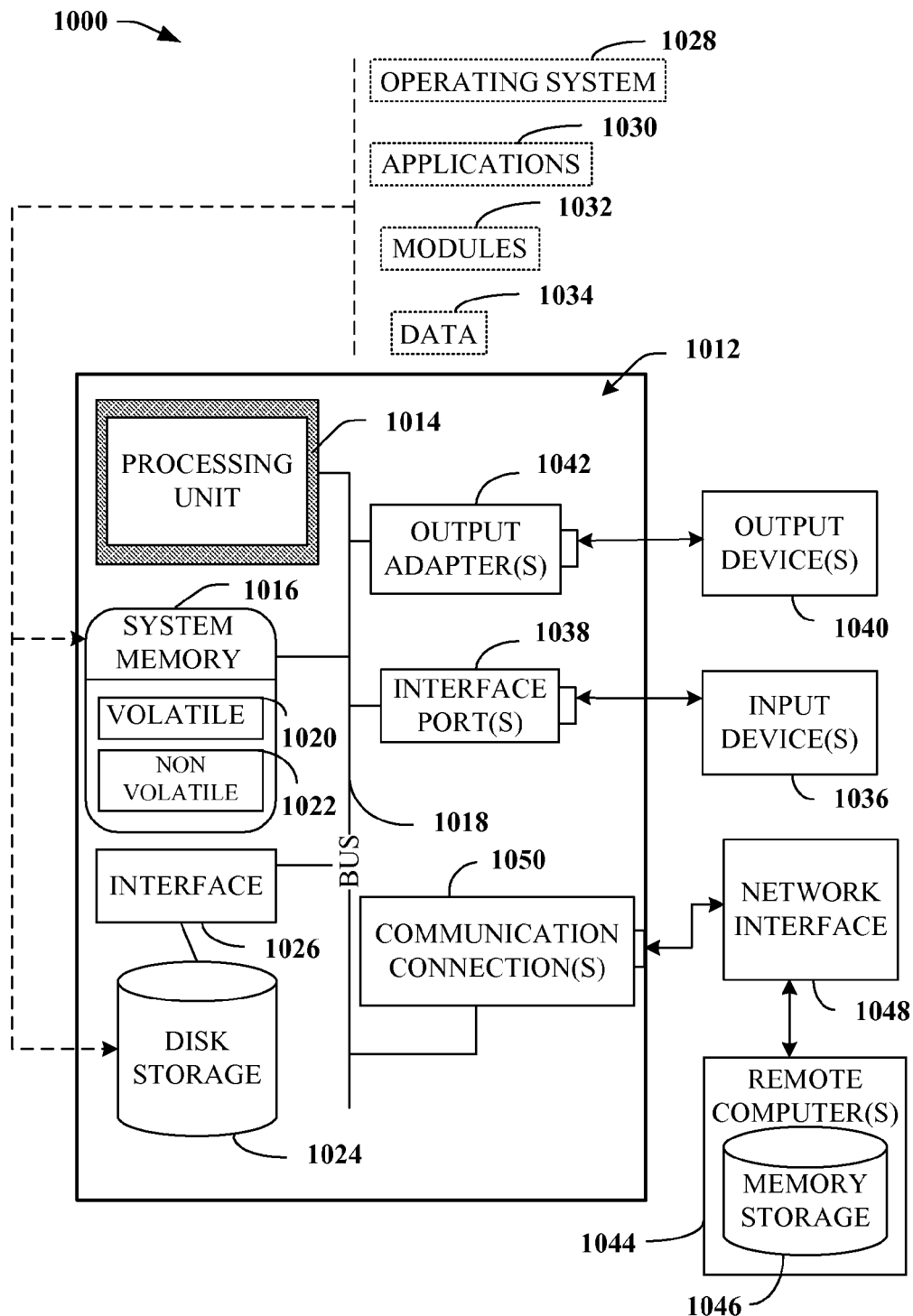
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a delegation component that automatically redirects an instant message session to a delegate upon notification and approval, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system comprising at least one processor coupled to at least one machine-readable storage medium storing instructions executable by the at least one processor to implement:
   a delegation component configured to automatically redirect an instant messaging communication from an entity intended for receipt of the instant messaging communication to a delegate, based on a rule;
a continuation component configured to continue or restart the instant messaging communication with the entity;
a log component configured to
    monitor at least one of an approval to send the instant messaging communication to the delegate or a disapproval to send the instant messaging communication to the delegate, and correspondingly modify the rule to indicate a preference,
    monitor a topic of the instant messaging communication, and
    provide a logged summarization of a content, including the topic, of communications during the instant messaging communication; and
an extender component configured to apply the rule in at least one additional communication mode other than instant messaging, the at least one additional communication mode including at least one of email, voice, audio, voicemail or text messaging,
    wherein the extender component is further configured to translate a forwarding rule associated with the at least one additional communication mode for application by the delegation component, and
    wherein the extender component is further configured to automatically create the rule based on evaluating disparate data communication modes and identifying delegation and forwarding rules associated with the disparate data communication modes for emulating in the instant messaging communication.

2. The system of claim 1, wherein the continuation component is further configured to interject an instant message communication into a communication between the delegate and a sender.

3. The system of claim 2, wherein the delegation component is further configured to
    provide a notification related to at least one of the delegate, a duration of delegation, or a reason for delegation, the notification comprising a request for approval to send the instant messaging communication to the delegate, and
    if the request for approval is denied,
    notify a delegating server in a header of an invitation to the instant messaging communication not to send the instant messaging communication to an indicated delegate, and
    cause the instant messaging communication to fail if sent to the indicated delegate.

4. The system of claim 1, wherein the rule is associated with at least one of an email application or a calendar application.

5. The system of claim 1, wherein the rule is configured to control at least one of viewing access or editing access to historic data associated with the instant messaging communication.

6. The system of claim 1, wherein the rule is configured to determine a time allotted to allow the instant messaging communication to be continued.

7. The system of claim 1, wherein the rule includes data related to at least one of a length of enforcement, a duration of delegation for the instant messaging communication, an assigned delegate, a notification setting, an assigned delegate for a specific sender, an assigned delegate for a particular incoming instant messaging communication, an accessibility privilege related to historic data of the instant messaging communication, an option related to continuing the instant messaging communication, a data communication extension setting, a password setting, a logging option, a historic item tracking setting, or a routing option.

8. The system of claim 1, wherein the rule identifies a plurality of delegates from which a particular delegate is selectable to receive the instant messaging communication.

9. The system of claim 1, wherein the log component is configured to track at least one delegated instant messaging communication.

10. The system of claim 1, wherein the delegation component is further configured to comply with a designation of the instant messaging communication indicating that the instant messaging communication is not to be re-directed to the delegate.

11. The system of claim 1, further comprising an automatic delegate identifier configured to identify the delegate by evaluating a portion of data related to at least one of a current instant messaging communication, an incoming instant messaging communication, data within an incoming instant messaging communication, a current instant messaging session, a previous instant messaging communication, a previous instant messaging session, an inferred context related to an instant messaging communication, an inferred topic related to an instant messaging communication, an inferred context related to an instant messaging session, or an inferred topic related to an instant messaging session.

12. The system of claim 11, wherein the delegation component is further configured to re-direct the instant messaging communication re-directed to the delegate to a sender, with an audio-visual feedback permitting the sender to choose whether to proceed with a conversation with the delegate.

13. The system of claim 1, further comprising a universal notification component configured to provide notification across a plurality of communication modes including at least one of email, voice, audio, voicemail, video, text message, VoIP communication, or short message service (SMS).

14. The system of claim 1, wherein the delegation component is further configured to prioritize delivery of a pending instant messaging communication between a manager and the delegate based on an order of the manager and the delegate assuming online status.

15. The system of claim 14, wherein the delegation component is still further configured to, if the delegate is offline, route the pending instant messaging communication to the manager instead of the delegate.

16. A computer-implemented method comprising using a processor coupled to a memory to perform at least one of the following operations:
    for an instant messaging communication from a sender to an entity intended for receipt of the instant messaging communication, re-directing the instant messaging communication from the entity to a delegate according to a rule;
    automatically identifying the delegate based on the delegate having pre-existing knowledge of a topic or context of the instant messaging communication;
    notifying the sender of the re-directing of the instant messaging communication;
    initiating the instant messaging communication between the delegate and the sender;
    accessing a history item related to the instant messaging communication; continuing or restarting the instant messaging communication between the entity and the sender using the history item;
    creating the rule automatically based on evaluating disparate data communication modes and identifying delegation and forwarding rules associated with the disparate data communication modes for emulating in the instant messaging communication; and applying the rule in at least one additional communication mode other than instant messaging, the at least one additional communication mode including at least one of email, voice, audio, voicemail or text messaging.

17. The computer-implemented method of claim 16, further comprising:

receiving at least one of an approval of the redirecting or a denial of the redirecting;

terminating the instant messaging communication if the receiving is of the denial of the redirecting; and supporting the instant messaging communication if the receiving is of the approval of the redirecting.

18. A computer-readable storage memory storing instructions that when executed by a computing device cause the computing device to perform operations comprising:

re-directing an instant messaging communication from an entity intended for receipt of the instant messaging communication to a delegate based upon a delegation rule;

automatically identifying the delegate based on previous delegation assignments;

monitoring a topic of the instant messaging communication and logging a summarization of content of the instant messaging communication including the topic;

continuing or restarting the instant messaging communication with the entity;

creating the delegation rule automatically based on evaluating disparate data communication modes and identifying delegation and forwarding rules associated with the disparate data communication modes for emulating in the instant messaging communication; and applying the delegation rule in at least one additional communication mode other than instant messaging, the at least one additional communication mode including at least one of email, voice, audio, voicemail or text messaging.

* * * * *